No. 802,746.
PATENTED OCT. 24, 1905.
A. A. GILLES.
ELASTIC TIRE
APPLICATION FILED FEB. 7, 1905.
5 SHEETS—SHEET 4.
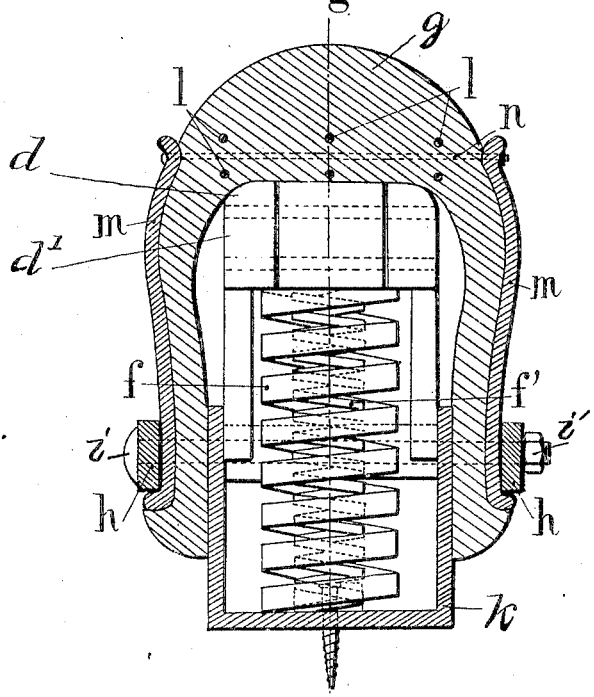
Fig. 4.
WITNESSES
INVENTOR
ATTORNEYS

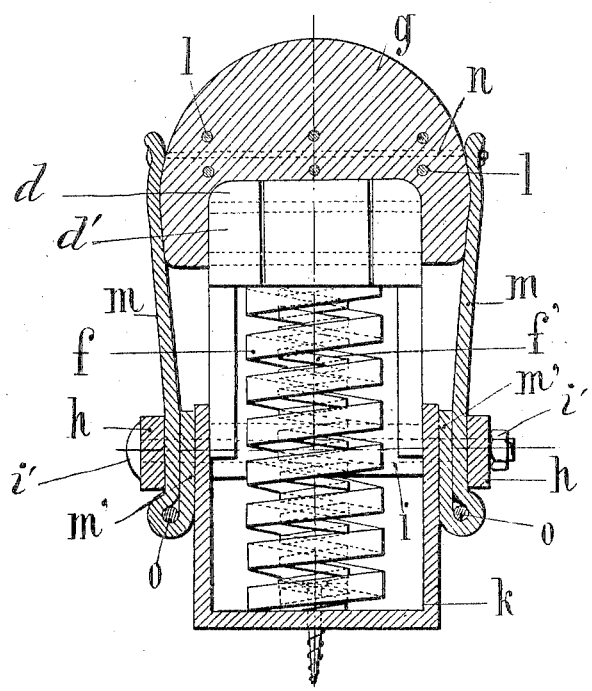

UNITED STATES PATENT OFFICE.

AUGUSTE ALPHONSE GILLES, OF NOGENT-SUR-MARNE, FRANCE.

ELASTIC TIRE.

No. 802,746. Specification of Letters Patent. Patented Oct. 24, 1905.

Application filed February 7, 1905. Serial No. 244,609.

*To all whom it may concern:*

Be it known that I, AUGUSTE ALPHONSE GILLES, a citizen of the Republic of France, residing in Nogent-sur-Marne, France, have invented certain new and useful Improvements in Elastic Tires for Vehicle-Wheels, of which the following is a specification.

The invention relates to elastic tires for use upon vehicles of different types, and has among its objects the provision of a tire for this purpose which is of maximum lightness and resiliency.

A further object of the invention is to furnish a tire which is very durable and proof against puncture, though of simple construction.

With these and other advantages in view the invention consists in the novel features which will hereinafter appear, and be defined in the claims.

Figure 1:
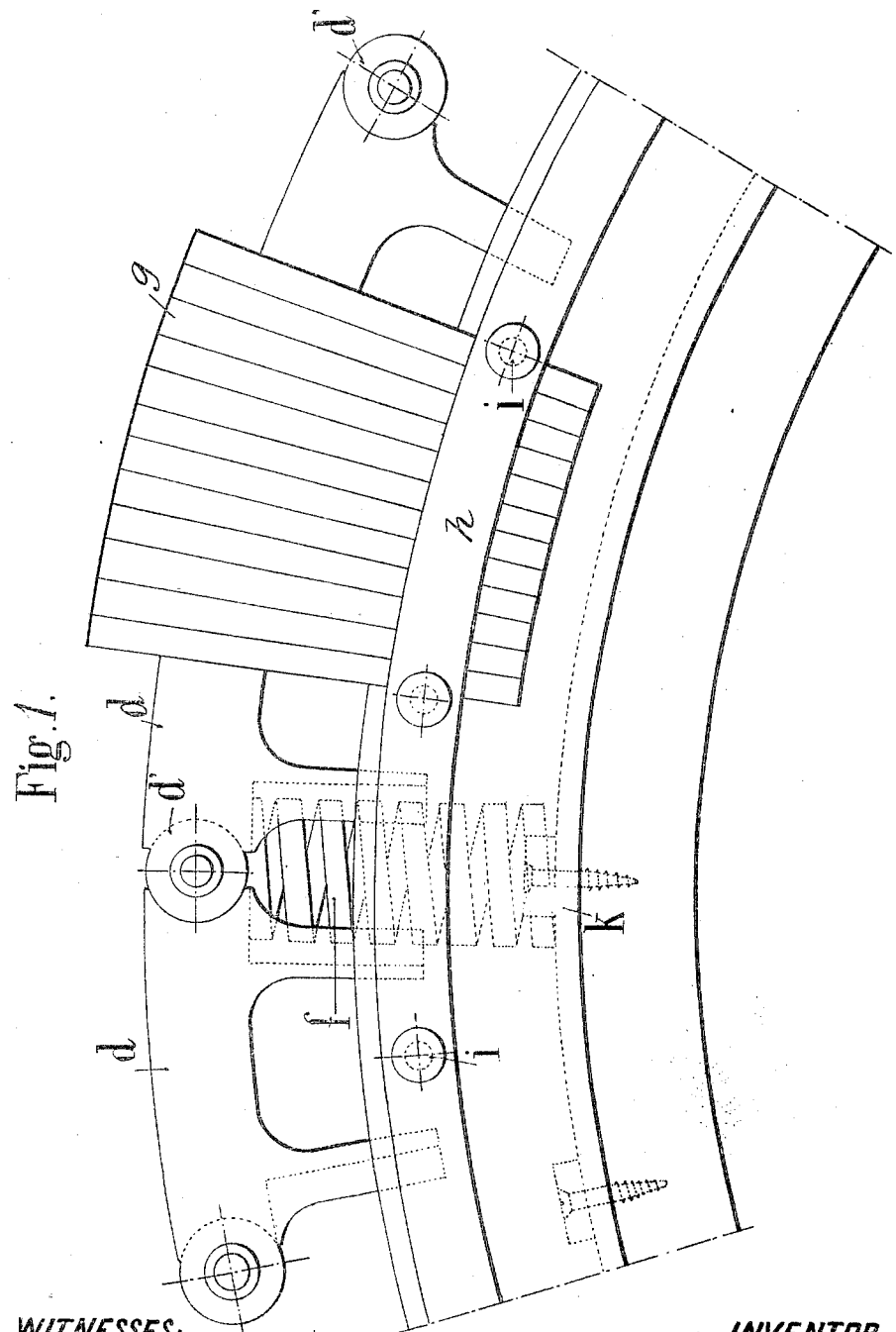
Figure 2:
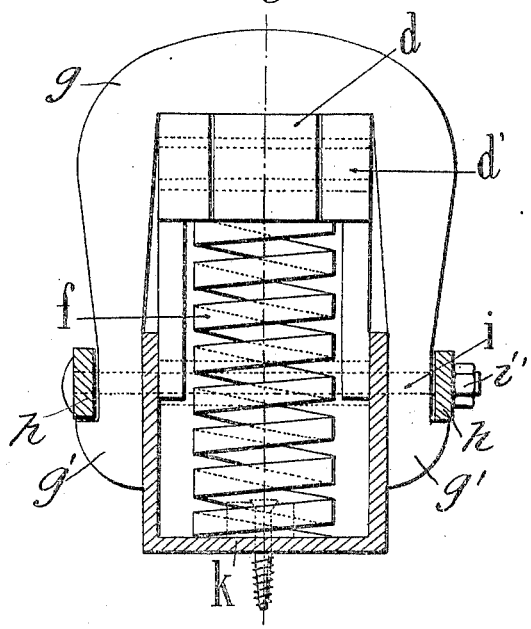
Figure 3:
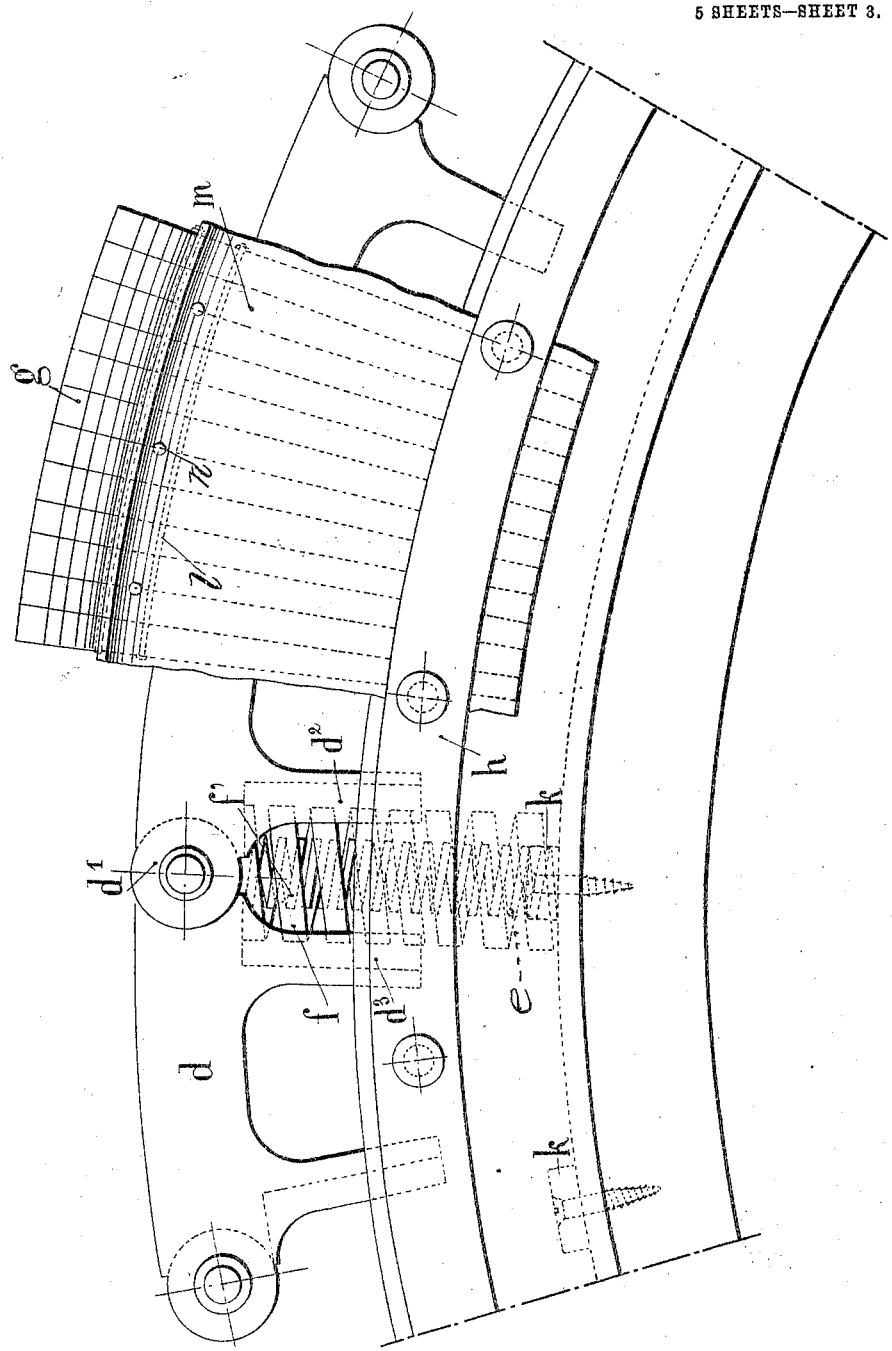

In the accompanying drawings, in which similar characters of reference denote corresponding parts throughout, Figure 1 is a side elevation of a portion of a tire embodying the invention. Fig. 2 is a vertical cross-section of the same. Fig. 3 is a side elevation of a slightly-modified form of tire. Fig. 4 is a vertical section through the tire shown in Fig. 3, and Fig. 5 is a vertical cross-section of a further modified form of tire.

Referring to the drawings, $k$ designates a rim of substantially U-shaped cross-section, which may be secured either to the rim of an ordinary wheel or directly to the spokes. Seated in the rim $k$ are a number of segmental sections or elements $d$, which are pivoted to each other at their ends by means of transversely-disposed bolts $d'$, which freely permit the pivotal movement of said elements in a vertical direction. Each element $d$ is provided adjacent each end with an inwardly-extending leg, as shown at $d^2$ and $d^3$ in Fig. 3. Adjacent the bolts or pivots $d'$ the end faces of the adjacent legs are bored vertically, so that a cylindrical seat for a helical compression spring $f$ is formed between said legs and beneath the pivot $d'$, said spring abutting at one end against the two adjacent elements and at the other end against the bottom of the rim $k$, as shown. In the modifications shown in Figs. 3, 4, and 5 a second spring $f'$ is employed, its provision being advantageous for some purposes, and said spring directly connects the pivots $d'$ with the bottom of the rim. It has also been found advantageous to have the springs $f$ and $f'$ arranged concentrically and wound in opposite directions, the latter being preferably arranged within the former, as shown.

The tread-surface of the improved tire is preferably constituted by a number of layers or sectors $g$, of leather or similar material, which are cut in substantially U shape and placed face to face over the elements $d$ in such a manner that their outer edges constitute the tread. Each layer $g$ is provided at each side with a shoulder $g'$, which is engaged by a hoop $h$, one at either side of the tire, so that the layers are thus firmly maintained in position. The hoops $h$ are secured to the rim $k$ by means of bolts $i$, which are disposed beneath the intermediate part of each element and also serve to reinforce and maintain rigidly in position the side walls of said rim, the inner portion of said bolts being provided with a sleeve for this purpose, while the nuts $i'$ firmly retain the bands $h$ in position.

In the arrangement shown in Figs. 3 and 4 strips or bands $m$ of leather or similar material are placed over the side edges of the pieces $g$, being retained beneath the hoops $h$ at their inner edges and fastened to said pieces $g$ at their outer edges by means of bolts $n$, which pass entirely through said pieces and interconnect the strips $m$ at either side of the tire, as shown. In this form the pieces $g$ are united by means of longitudinally-extending rods $l$, the number of which may vary.

The forms of the tire which have been previously described are designed particularly for use upon the wheels of heavy vehicles. In Fig. 5 is illustrated a form of tire for use upon light vehicles, such as motor-cycles, for example. In this form the tread-pieces $g$ do not extend inwardly as far as in the other forms, but the strips $m$ are applied in substantially the same manner, except that they are doubled at their inner edges to receive rods $o$, which thus form shoulders in said strips, against which the hoops $h$ rest, as shown.

Having thus described my invention, I claim as new and desire to secure by Letters Patent—

1. In a tire for vehicle-wheels, the combination, with a rim, of a plurality of interconnected elements seated therein and provided adjacent each end with an inwardly-extending leg, and a spring seated between the adjacent legs of each two adjacent elements and bearing against said elements and said rim.

2. In a tire for vehicle-wheels, the combination, with a rim, of a plurality of interconnected elements seated therein and provided adjacent each end with an inwardly-extending leg, the adjacent legs of adjacent elements being cut away to form cylindrical seats, and helical springs in said seats bearing against said rim.

In testimony whereof I have signed this specification in the presence of two subscribing witnesses.

AUGUSTE ALPHONSE GILLES.

Witnesses:
 JULES RONNET,
 EMILE LEDRET.